July 29, 1941.    R. KAY    2,251,137
ORNAMENTAL FACING FOR CLOSURES
Filed April 11, 1939    4 Sheets-Sheet 1
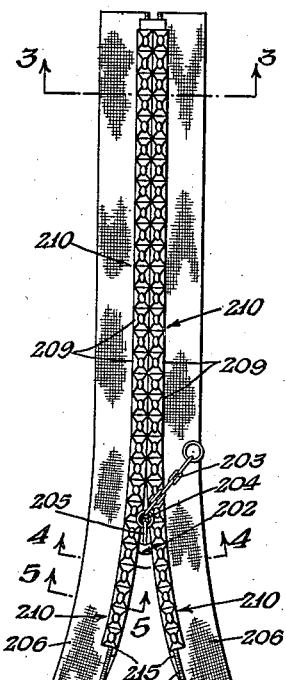
FIG. 1
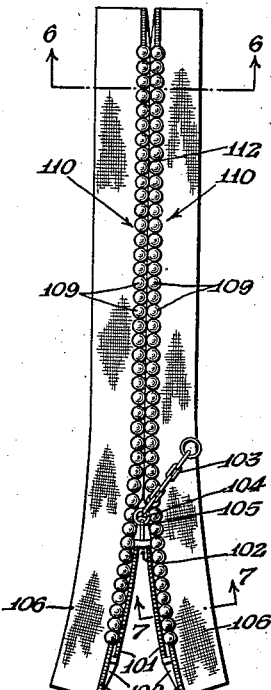
FIG. 2
FIG. 3
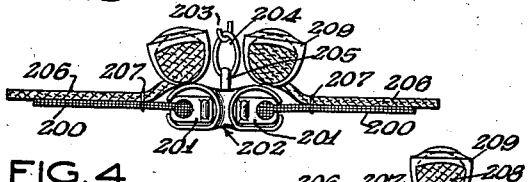
FIG. 4
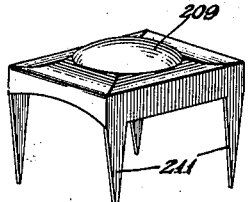
FIG. 5
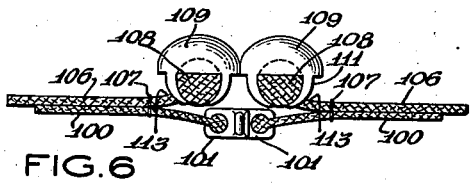
FIG. 6
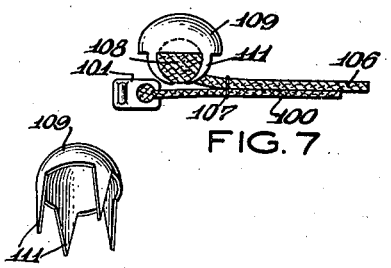
FIG. 7
FIG. 9
FIG. 8
INVENTOR.
RALPH KAY
BY Ostrolenk & Greene
ATTORNEYS

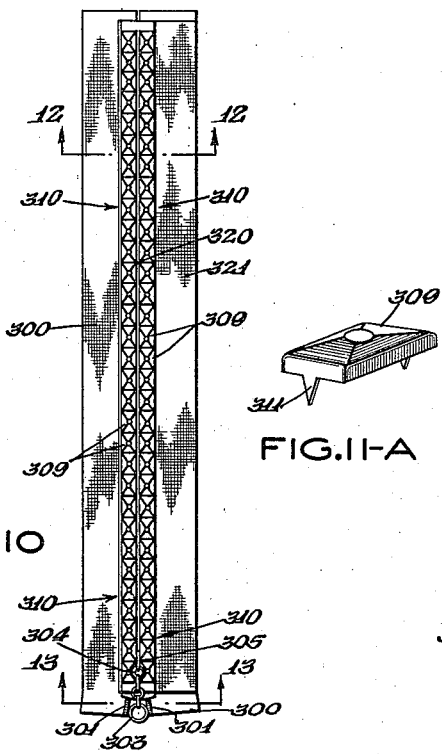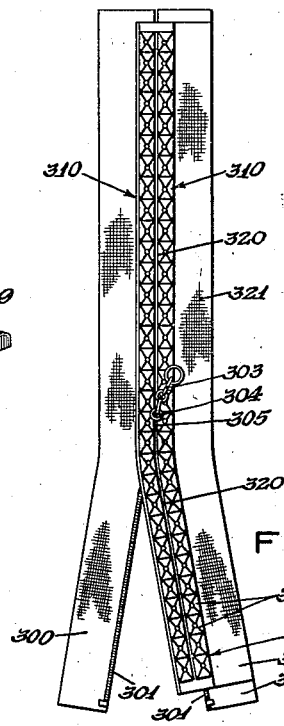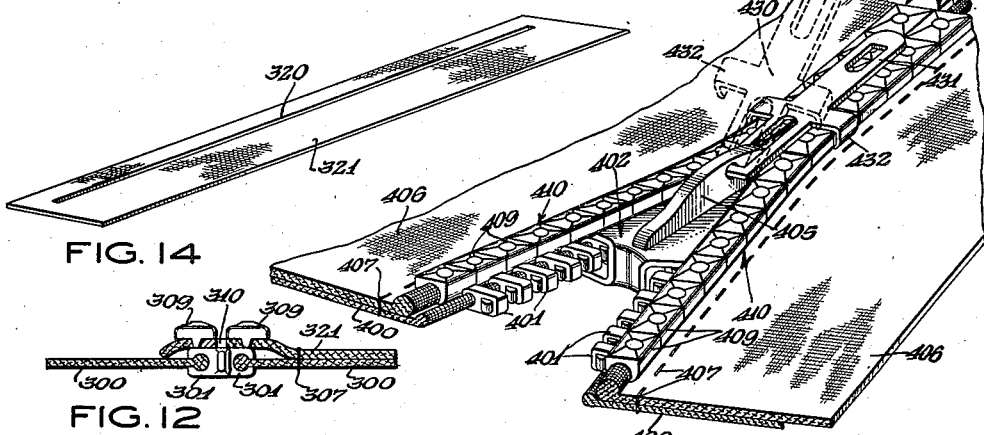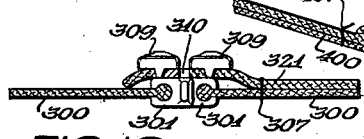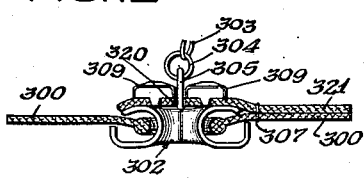

July 29, 1941.  R. KAY  2,251,137
ORNAMENTAL FACING FOR CLOSURES
Filed April 11, 1939   4 Sheets-Sheet 3

INVENTOR.
RALPH KAY
BY Ostrolenk + Greene
ATTORNEYS

July 29, 1941. R. KAY 2,251,137
ORNAMENTAL FACING FOR CLOSURES
Filed April 11, 1939 4 Sheets-Sheet 4
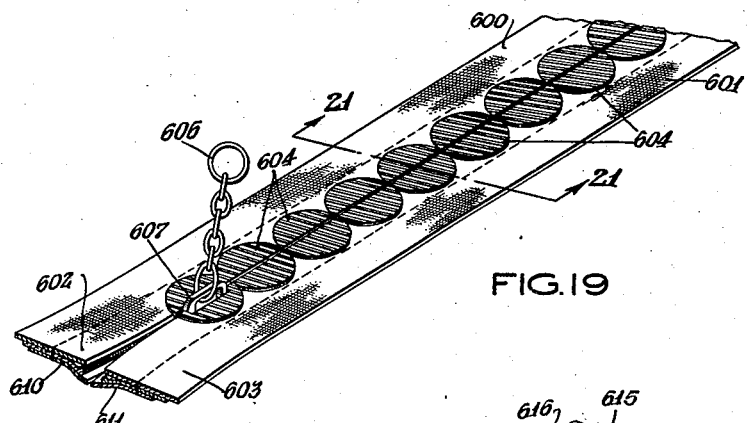
FIG.19
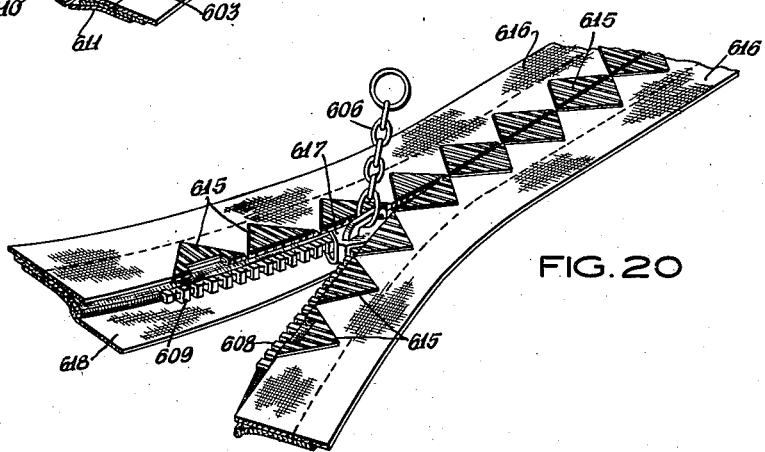
FIG.20
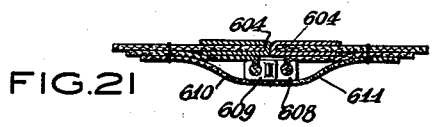
FIG.21
  
FIG.22  FIG.23  FIG.24
INVENTOR.
RALPH KAY
BY
ATTORNEYS Patented July 29, 1941

2,251,137

UNITED STATES PATENT OFFICE 2,251,137

ORNAMENTAL FACING FOR CLOSURES

Ralph Kay, New York, N. Y., assignor to Novel Slide Manufacturing Corporation, a corporation of New York Application April 11, 1939, Serial No. 267,223

16 Claims. (Cl. 24—205)

This invention relates to slide closures and to ornamental coverings therefor, whereby the nature of the closure may be concealed when desired, and more particularly relates to the use of metallic flaps or metallic ornaments of various kinds for effecting the concealment by ornamentation.

Heretofore in the use of slide fasteners of various types, the emphasis has necessarily been on the appearance of the fastening means itself, particularly when the fastener is used in connection with garments of various kinds. In such cases, unless extreme care is taken to arrange and color the fastener in a particularly harmonious fashion, the fastener becomes an unsightly portion of the garment and must therefore be placed in such position as to be not normally visible.

In order to overcome this difficulty, slide fasteners have been constructed not necessarily with a view to efficiency in operation, but rather with a view to pleasing appearance when closed, so that it has been necessary to form fasteners out of plastic and colored materials, to make the individual members of the fasteners extremely small so that the closure will not be too unsightly, and to otherwise treat the fastener itself in such a manner as to prevent its detracting from the appearance of the garment.

The present invention contemplates the formation of the slide fastener member in such manner that it may be unnecessary to treat the slide fastener itself in any particular way in order to render it harmonious with the garment, but rather it will be possible to use the most efficient type of slide fastener irrespective of whether the members comprising the slide fastener will or will not harmonize with the garment itself.

This may be accomplished in one form of this invention by the use of a wear resistant metallic ornamentation constituting virtually an additional flap for the slide fastener and so arranged as to conceal the members of the slide fastener, particularly when the fastener is closed. By the use of a construction of this type and of the various modified forms to be hereinafter described, it will be possible to place a slide fastener closure on any type of garment and in any desired portion of the garment, the concealing metallic ornamental members being arranged to harmonize with the garment itself and to prevent any unsightly but efficient slide fastener from being visible.

An object of this invention, therefore, is to provide a slide fastener having ornamental concealing members which may be caused to harmonize with the garment upon which it is placed.

A further object of this invention is to provide in connection with a slide fastener, additional flaps carrying ornamentation and arranged to conceal the slide fastener when closed.

Further objects of this invention are to so arrange the slide fastener and ornamental flaps that where desired, the slide fastener may even be concealed when the fastener is opened.

Additional objects of this invention are to provide other ornamental and efficient closure means in connection with slide fasteners and ornamental flaps for the purpose of maintaining the slide fastener in any desired closed or partially closed position, while at the same time causing the slide fastener to be concealed.

Other objects and uses of the present invention will become in part apparent and in part pointed out in the following description and specification in which:

Figure 1 is a plan view of one form of the invention showing additional flaps bearing wear resistant metallic ornamentation for concealing the slide fastener.

Figure 2 is a slightly modified form showing a different arrangement of the ornamentation and a slightly different relationship between the fastener and the ornamentation as hereinafter described.

Figure 3 is a cross-sectional view taken on line 3—3 of Figure 1.

Figure 4 is a cross-sectional view taken on line 4—4 of Figure 1.

Figure 5 is a cross-sectional view taken on line 5—5 of Figure 1.

Figure 6 is a cross-sectional view taken on line 6—6 of Figure 2.

Figure 7 is a cross-sectional view taken on line 7—7 of Figure 2.

Figure 8 is a view in perspective of one of the findings used in this formation of the ornamental flap of Figure 1.

Figure 9 is a view in perspective of one of the findings used in the formation of the ornamental flap of Figure 2.

Figure 10 is a plan view of a modified form of slide fastener and ornamental concealing flap formed in a manner hereinafter described.

Figure 11 is a view of the slide fastener member of Figure 10 partially opened.

Figure 11a is a view in perspective of one of the findings used in the formation of the ornamental flaps of Fig. 10.

Figure 12 is a cross-sectional view taken on line 12—12 of Figure 10.

Figure 13 is a cross-sectional view taken on line 13—13 of Figure 10.

Figure 14 is a view in perspective of a cloth or flexible flap for maintaining the findings of Figure 11a to form the ornamental flaps of Figures 10 and 11.

Figure 15 is a view in perspective of a slightly modified form of slide closure member showing additional members on the slider for maintaining the desired relationship of ornamental flaps when the fastener is closed.

Figure 19 is a perspective of a modified form of my invention in which I show the novel features of the metal ornament bent over the edge of the upper flap to form a wear resistant cover therefor and also two lower flaps which extend under the slide fastened so as to cover the bottom of the slide fastener and protect the body from the metal thereof.

Figure 20 is a perspective of a modified form of my invention showing the metal ornaments bent over the upper flaps, and a single bottom protecting flap which covers the metallic slide fastener.

Figure 21 is a cross-section taken along the lines 21—21 of Figure 19.

Figure 16:
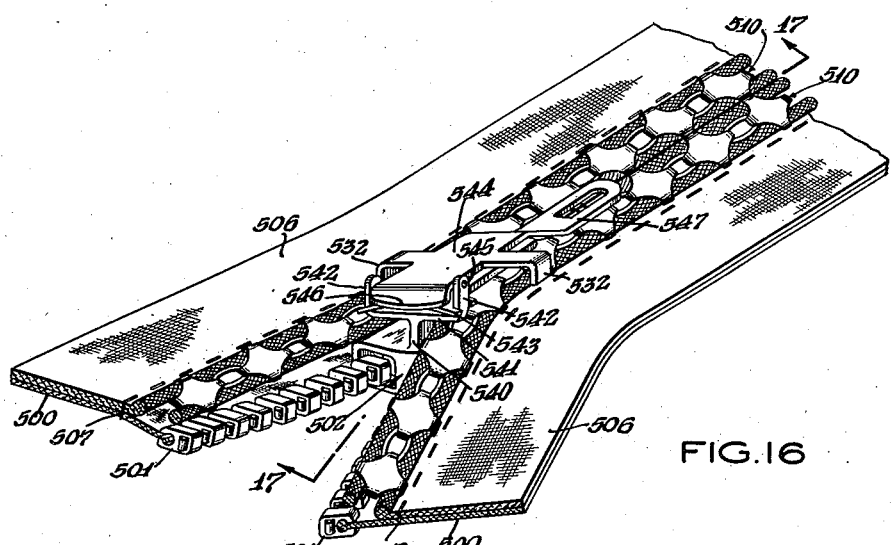
Figure 16 is a view in perspective of a modified form of the construction of Figure 15 showing a slider having the construction of Figure 15 but also in the form of a metallic ornamental clip for maintaining the closure.

Figures 22, 23, and 24 are plan perspectives of the various ornaments which may be employed. The dividing line in the metal marks the line of bend over the flap.

Referring now to Figure 2, the slide fastener herein shown comprises, as seen in Figures 2, 6 and 7, a pair of tapes 100, 100, each of said tapes carrying along one edge thereof a series of metallic members 101, 101 suitably arranged to form a slide fastener of the type well known in the art. A slider 102 of the conventional form causes the members 101, 101 on opposite tapes 100, 100 to interlock or disengage as it is drawn along said members in a manner well known in the art.

The slider 102, however, is made so that its upper surface may be as flat as possible while providing for efficient operation of the slider. A chain or other pull member 103 is attached by the ring 104 to the loop 105 of the slider 102. The loop 105 on the slider is so arranged that the ring 104 may slide to approximately either end of the slider so that a pull by means of the the chain 103 upon the slider 102 will tend to be a dragging one.

Additional tapes 106, 106 are fastened to the tapes 100, 100 in any suitable manner, as for instance, by the stitching 107, 107. The said tapes 106, 106 may have at a longitduinal edge thereof a folded or tubular cloth arrangement 108, 108 or any other suitable arrangement for mounting metallic findings 109, 109 such as that shown in Figure 9 for the purpose of forming the ornamental metallic strips 110, 110.

As is seen in Figures 6, 7 and 9, the findings 109, 109 may have prongs 111 for the purpose of engaging them upon the edges or tubes 108. Also, as seen in Figure 2, the findings 109 may be arranged sufficiently close to each other to form a virtually continuous metallic ornamental strip 110. The findings also, as seen in Figures 2 and 6, may be so arranged that when the slide is closed by means of the drawing of the slide member 102 over the members 101, the ornamental metallic strip 110 formed by the findings 109 are drawn together so that the findings meet as seen at 112 of Figure 2 to produce an efficient covering or concealment for the slide fastener. In this way, by a suitable variation in the color, shape or arrangement of the findings 109 and the metallic strips 110, 110, the slide fastener member may be so arranged that it will harmonize with any garment upon which it may be mounted.

As seen in Figure 6, the tapes 106, 106 carrying metallic ornamental findings 109 may be the longer ones and may thus be sewn into the garment along any suitable portion thereof or, if desired, the tapes 100, 100 may be longer and these may be sewn into the garment. Or the entire slide member may be sewn into the garment at any suitable position irrespective of which is the wider tape. In either case, in this type of construction it may well be unnecessary to sew the tape into the garment in such a manner that the stitching is beyond an edge of the gap in the garment, but rather the end of the garment adjacent the gap may extend up to the point 113, 113 (Figure 6), the findings 109 then being so arranged as to form a metallic strip 110, 110 which will appear to be a part of the garment itself.

To accomplish these various purposes of concealment, the findings naturally may have any formation dictated by the designer of the garment or by the necessity for concealment. Thus their lateral edges may extend as far beyond the point of attachment as may be desired for the purpose of effecting concealment. Their ornamentation and shape may be varied for the purpose of effecting concealment and harmonization with the balance of the garment. Their method of fastening may be varied in accordance with the type of finding and the amount by which it is to project upon the fastening. If desired, the findings need not necessarily be metallic, and the metallic strip 110 need not necessarily be composed of a series of disconnected metallic or other findings attached to a longitudinal strip, but may comprise a continuous ornamental strip of metal or other material and where such continuous strip is to be flexible, it may be formed of a mesh or otherwise interlocked but continuous member.

In the form thus far described, the sole dependence has been on the formation of the metallic ornamental strip and the arrangement of the findings or other members forming the strip for the purpose of effecting the concealment. While this is the principal object of this invention, other means may be provided in association therewith for the purpose of effecting the object of concealing the slide fastener, particularly when the fastener is closed. Such various formations may take different embodiments, all within the spirit of the present invention.

In Figures 1, 3, 4 and 5, however, there has been illustrated a slightly modified form wherein the interengaging members of the slide fastener are so mounted as to insure their concealment even when the slide fastener is opened. In this case, as seen in those figures, the slide fastening members 201, 201 are mounted on elastic tapes 200, 200, said tapes being preferably stretchable in every direction and thus formed preferably from interwoven elastic thread. The ornamental findings 209 forming the metallic strip 210 are mounted upon a fold or tube 208 in a strip of cloth 206 which is fastened by stitching 207 or in any other suitable manner to the stretchable tape 200.

As seen in Figures 1 and 5, the stretchable tape 200 is so arranged that when the slide fastener is opened, the stretchable tape tends to withdraw the metallic interlocking members 201 to a point where they lie just within the outer boundary 215 of the metallic findings 209, forming the continuous strip 210. In this way, when the slide fastener is opened in the manner and by the means hereinbefore described, the interlocking members 201 comprising the slide fastener are retracted as seen in Figures 1 and 5, by the elastic tape 200 so that they are no longer visible from in front of the metallic strip 210. Where, however, it is necessary to close the slide fastener by drawing the slider 202 thereover in the manner hereinbefore described, then the elastic tape 200, 200 by its elasticity, is thus permitted to stretch and to allow the members 201, 201 to interlock. In this way an ornamental slide fastener is provided which will allow its attachment in any garment of any type, the sole requirement being that the findings 209 or the metallic strip 210 be arranged to harmonize with the garment upon which the fastener is mounted. The slide fastener may otherwise have the same construction as that hereinbefore described, may be mounted in the garment in the manner hereinabove described, and in general, the sole variations between the slide fastener of the type of Figure 1 and that of the type of Figure 2 is the provision of the elastic or stretchable tape for the mounting of the interlocking members of the slide fastener in order to insure concealment of these members at all times.

It will, of course, be clear that instead of the stretchable tape 200, other types of retracting means may be provided for the tape carrying the interlocking members 201. Thus for instance, stitching of elastic material may be incorporated between the tapes 206 and the tapes 200, the elastic running in such a direction as to tend to retract the tape 200. Or the tape 200 may be so arranged as to curl in an appropriate direction for concealing the interlocking portions of the slide fastener when no tension is applied thereon, thus permitting them to be concealed when they are not interlocked.

In Figure 8, there is shown in perspective another type of finding for use in the formation of the metallic strip 110 or 210. It will be understood, of course, that the metallic strips, as hereinbefore mentioned, may have any formation dictated by the designer or by the constructions available,—that the strips need not necessarily be metallic nor need they necessarily be formed of individual separate members.

In Figures 10 and 11 there is shown a further modified form which will permit of the concealment of the slide fastener when the fastener is closed and which will also provide for a predetermined spacing apart of the two metallic strips so that the metallic strips can, under no circumstances, be separated by more than a predetermined distance, which predetermined distance may be sufficiently small merely to permit the chain or other drawing mechanism of the slider to project therethrough for the purpose of opening the slide fastener; and even in this type of construction, the predetermined distance apart thus provided may be a maximum distance, the findings or other members comprising the ornamental strip being arranged to meet to provide a complete concealment for the slide fastener.

As seen more particularly in Figures 11 and 12, findings 309 of the type shown in Figure 11a or any other suitable findings or ornamental member may be mounted on either side of the gap 320 (Figure 14) in the cloth member 321 to form the construction shown in Figures 11 and 12. The interlocking metallic members 301 forming the slide closure may be mounted upon tapes 300 in any suitable manner as hereinbefore described.

The cloth tape 321 having the slot 320 and carrying the metallic ornamental strips 310, formed in the specific construction herein shown, of the findings 309 may be stitched or sewn or otherwise attached by any suitable manner as by the threads 307 to one of the tapes 300 and is not attached to the other tape. In this way, as seen in Figures 10 and 11, a continuous metallic strip is formed having a slot 320 down the center thereof, registering with the slide fastener and so arranged as seen in Figure 13. The loop 305 of the slider 302 may project sufficiently through the slot so that the ring 304 of the chain 303 may be attached thereto and draw the slider in the appropriate direction for either closing or opening the member.

In this way, by appropriate arrangement of the findings 309 or by appropriate arrangement of any other of the members which may be used in the formation of the ornamental strip 310 upon the cloth 301, the gap 320 may be made sufficiently small as to prevent any view of the interlocking members 301, 301 of the slide fastener. Likewise, the findings 309 or the other members forming the metallic strip 310 may be so arranged as to meet at the slot 320 but may be so flexibly mounted as to permit the loop 305 of the slider 302 to pass between them without being caught or snagged by any of the members.

The mounting of the findings 309 or any other type of findings on the cloth 321 or the mounting of flexible ornamental members on the cloth 321 is arranged so that the slide fastener may be as flexible as the garment in which it is mounted. Where the slide fastener is to be so short that the flexibility thereof is immaterial or where it is to be arranged in such a manner that the flexibility thereof is immaterial, then the ornamental strips 310, 310 may comprise a single rigid metallic member having an appropriate slot therein for the purposes herein described.

In Figure 15 there is illustrated a slightly modified form wherein the modification is in the slider and the members associated therewith. The construction of this type of slide fastener is to a great extent similar to that of Figure 2 wherein the findings 409 forming the metallic or other ornamental strip 410 are mounted on a tape 406 which is stitched by the threads 407 to the tape 400 which carries the interlocking members 401, the findings 409 for the ornamental strip 410 being so arranged on their respective tapes 400 that when the slide fastener is closed, the findings or metallic strips meet and conceal the interlocking members 401 of the slide fastener.

In this form, the slider 402 carries a loop 405 upon which is hingedly mounted a pulling member 430 in the loop 431 of which any suitable chain may be fastened if desired. The pulling member 430 carries at the lateral edges thereof, prongs or clips 432, 432 so arranged that when the pulling member 430 is in the position shown by the solid lines of Figure 15, the prongs or clips 432 will engage the outer edges of the metallic strips 410, 410 and serve further to bind them together in such position as to conceal the interlocking members 401 of the slide fastener beneath.

When it is desired to open or close the slide fastener, then the pulling member 430 is raised, thus disengaging the prongs 432 from the metallic strips 410 and thus permitting the slider 402 to be drawn in the appropriate direction. When the slider 402 has reached the desired position of closure, then depressing the pulling member 430 will cause the prongs or clips 432 to engage the outer lateral edges of the strips 410, pressing them towards each other and further serve to effectually conceal the interlocking members 401 of the slide fastener.

Figure 17:
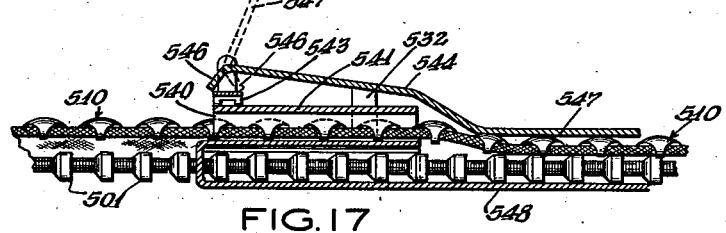
Figure 17 is a cross-sectional view on line 17—17 of Figure 16.
Figure 18:
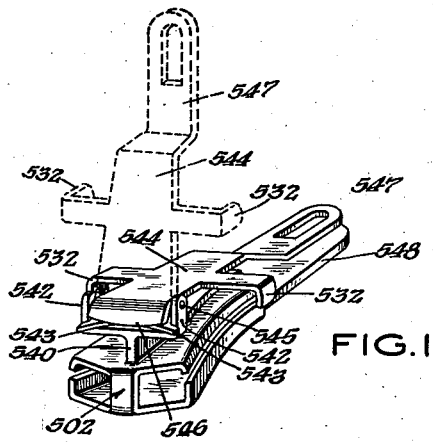
Figure 18 is a view in perspective of the slider of Figures 16 and 17.

In Figures 16, 17 and 18, there is shown a further slight modification of the form of Figure 15 wherein the construction of the metallic strips, the slide fastener and the arrangement thereof relative to each other may be the same as that shown in Figures 15 and 2. The variation, however, is shown in the formation of the slider and associated clip therefor. In this construction, the metallic interlocking members 501, 501 are mounted on tapes 500, 500 in the manner hereinbefore described and the ornamental strips 510, 510 are mounted on the tapes 506, 506 in the manner hereinbefore described, which tapes are attached in any suitable manner as by the stitching 507 to the tapes 500. In this particular construction, the ornamental strips 510 are shown as formed of an interlinked formation mounted upon appropriate tubes or folds of cloth. As hereinbefore pointed out, the ornamental formation may take any form appropriate to the garment and construction in which the slide fastener is used.

The slider 503 carries at the outer surface thereof a projection 540 upon which is mounted a small platform 541 having two small arms 542, 542 extending perpendicular thereto. A metallic spring 543 (Figures 16, 17 and 18) is mounted in engagement with the perpendicular arms 542 and is so arranged as to resist compression thereof towards the small platform 543.

A pulling member 544 for the slider 502 is hingedly mounted by the pivots 545 on the small perpendicular arms 542. The pulling member 544 carries along the lateral edges thereof prongs or clips 532 arranged to engage the outer edges of the metallic or other ornamental strips 510 for the purpose and in the manner hereinbefore described. The pulling member 544, however, also carries at the rear end thereof, a small projection 546 adapted to be engaged by the spring 543 and, as seen in Figure 17, the pulling member 544 by reason of the engagement of the tail or rear portion 546 with the spring 543 will be stiffly held in the down or engaging position when it is lowered to the position shown by the solid lines, and it will be stiffly held in the up or disengaged position when in the position shown by the dotted lines.

As seen therefore in Figures 17 and 18, the pulling member 544 may be curved so that it has an extended portion 547 which will be in firm engagement with the upper side of the metallic strips 510 when the entire clip is closed. In order that this engagement be effective and function as a clip, the under side of the slider 502 may be extended at 548 to form the opposite portion of the clip and to provide a rigid metallic abutment for the extended member 547. In this way, the pressure exerted by the spring 543 which is thus effective upon the extended member 547 and thus tending to press it upon the ornamental strips 510 and through the slide fastener upon the extension 545, serves to form a clip for holding the slider 502 in exact desired position for holding the ornamental strips together in order to effect the concealment desired.

Where such clip means is used on garments for women it presents no additional problems since women are accustomed to the operation of this type of clip, although the specific formation thereof and the means which makes it operate in this way may well be novel as well as the arrangement of the clip in connection with the slide fastener and concealing means herein described.

In Figure 19, I show tapes 600 and 601 which terminate in flaps 602-3 over which are bent metallic ornaments 604. The bent formation is shown in Figure 21 and it can be seen that the arrangement is such that these ornamental flaps lie flat over the slide fastener. The chain 606 attached to the slide 607 engages the elements 608 and 609 to effect closure of the member. On the under side of this slide fastener are flaps 610 and 611 which meet at their terminus and effectively cover the metallic series of elements which constitute the slide fastener. Thus when the slide fastener is used in the dress or the like, the metal is not in contact with the flesh of the wearer.

In Figure 20 I show a modified form in which the metallic ornaments 615 are mounted on tape 616 and connected by a slide fastener arrangement shown at 617. On the under side, I provide a cover flap 618 which extends as can be seen beyond the metallic slide fastener elements so that they are completely covered. This single flap has certain advantages in that it can be placed so that there is complete isolation of the metal of the slide fastener from the flesh of the wearer.

In Figure 21 it will be noted that the elements are fastened to the cloth from the side so that the ornamental flaps lie flat thereover.

Figures 22, 23 and 24 represent attractive designs of the metal ornament before it is folded over the cover flap and clamped thereon.

Only a few of the various formations which the present invention may take have been described. Concealment may be effected in many and various different ways. The concealing members comprise essentially an additional flap for the slide fastener itself. The concealing members may be formed of individual metallic findings fastened to form an apparently continuous strip, may be formed of a continuous meshed metal, may be formed of any other flexible or non-flexible material and may in certain cases even be inflexible.

The concealment may take place by reason of the arrangement of the metallic strips themselves, by reason of the mounting of the slide fastener mechanism upon its own tape, by reason of the formation of the associated clips or other fastening means, and even by the arrangement of a single slotted flap.

These ornamental slide fastener covers of my invention may actually constitute or take the place of ornaments which are customarily used on dresses and the like. The ornaments which constitute the flap covers for my slide fasteners not only completely conceal the slide fastener but are true ornaments of themselves.

These various different ways merely illustrate the method and means for concealment and are by no means to be taken as exhaustive of the various combinations useful in the construction. It is preferred, therefore, that this invention be not limited to the specific disclosures herein described, but only by the appended claims.

What is claimed is:

1. A closure member comprising a pair of tapes arranged in the same plane and in parallel abutting relation; interlocking elements mounted on abutting edges of said tapes; a slider having operating means for operating said interlocking elements; substantially self-sustaining elements mounted in closely spaced relation along and overlying said interlocking elements, the opposed edges of said substantially self-sustaining elements substantially abutting, said substantially self-sustaining elements forming wear resistant surfaces for the slider operating means; and means securing said self-sustaining elements to said tapes.

2. A closure member comprising a pair of tapes arranged in the same plane and in parallel abutting relation; interlocking elements mounted on abutting edges of said tapes; a slider having operating means for operating said interlocking elements; means longitudinally mounted on each of said tapes, said means overlying said tapes and having opposed edges; substantially rigid elements mounted longitudinally in closely spaced relation on said means, the opposed edges of said substantially rigid elements being substantially abutting and overlying said interlocking elements, said substantially rigid elements forming wear resistant surfaces for the slider operating means.

3. A closure member comprising a pair of tapes arranged in the same plane and in parallel abutting relation; interlocking elements mounted on abutting edges of said tapes; a slider having operating means for operating said interlocking elements; a flap longitudinally mounted on each of said tapes, said flaps overlying said tapes and having opposed edges; substantially rigid elements mounted in closely spaced relation along the opposed edges of said flaps and overlying said interlocking elements, said substantially rigid elements forming wear resistant surfaces for the slider operating means.

4. A closure member comprising a pair of tapes arranged in the same plane and in parallel abutting relation; interlocking elements mounted on abutting edges of said tapes; a slider having operating means for operating said interlocking elements; means longitudinally mounted on each of said tapes; said means overlying said tapes and having opposed edges; substantially self-sustaining elements mounted continuously along the opposed edges of said means and overlying said interlocking elements, said substantially self-sustaining elements forming wear resistant surfaces for the slider operating means.

5. A closure member comprising a pair of tapes arranged in the same plane and in parallel abutting relation; interlocking elements mounted on abutting edges of said tapes; a slider having operating means for operating said interlocking elements; means longitudinally mounted on each of said tapes, said means overlying said tapes and having opposed edges; plastic elements mounted in closely spaced relation along the opposed edges of said means and overlying said interlocking elements, said plastic elements forming wear resistant surfaces for the slider operating means.

6. A closure member comprising a pair of tapes arranged in the same plane and in parallel abutting relation; interlocking elements mounted on abutting edges of said tapes; a slider having operating means for operating said interlocking elements; means longitudinally mounted on each of said tapes, said means overlying said tapes and having opposed edges; metallic elements mounted in closely spaced relation along the opposed edges of said means and overlying said interlocking elements, said metallic elements forming wear resistant surfaces for the slider operating means.

7. A closure member comprising a pair of tapes arranged in the same plane and in parallel abutting relation; interlocking elements mounted on abutting edges of said tapes; a slider having operating means for operating said interlocking elements; a flap longitudinally mounted on each of said tapes, said flaps overlying said tapes and having opposed edges; substantially rigid elements mounted continuously along the opposed edges of said flaps and overlying said interlocking elements, said substantially rigid elements forming wear resistant surfaces for the slider operating means.

8. A closure member comprising a pair of tapes arranged in the same plane and in parallel abutting relation; interlocking elements mounted on abutting edges of said tapes; a slider having operating means for operating said interlocking elements; a flap longitudinally mounted on each of said tapes, said flaps overlying said tapes and having opposed edges, plastic elements mounted in closely spaced relation along the opposed edges of said flaps and overlying said interlocking elements, said plastic elements forming wear resistant surfaces for the slider operating means.

9. A closure member comprising a pair of tapes arranged in the same plane and in parallel abutting relation; interlocking elements mounted on abutting edges of said tapes; a slider having operating means for operating said interlocking elements; flaps longitudinally mounted on each of said tapes, said flaps overlying said tapes and having opposed edges; metallic elements mounted in closely spaced relation along the opposed edges of said flaps and overlying said interlocking elements, said metallic elements forming wear resistant surfaces for the slider operating means.

10. A closure member comprising a pair of tapes arranged in the same plane and in parallel abutting relation; interlocking elements mounted on abutting edges of said tapes; a slider having operating means for operating said interlocking elements; means longitudinally mounted on each of said tapes, said means overlying said tapes and having opposed edges; substantially rigid elements mounted in closely spaced relation along the opposed edges of said means and overlying said interlocking elements, said substantially rigid elements forming wear resistant surfaces for the slider operating means, said tapes comprising means for retracting the edges thereof carrying the interlocking elements when said closure member is opened, said interlocking elements being concealed by said overlying means and rigid elements when said closure member is opened.

11. A closure member comprising a pair of tapes arranged in the same plane and in parallel abutting relation; interlocking elements mounted on abutting edges of said tapes; a slider having operating means for operating said interlocking elements; a flap longitudinally mounted on each of said tapes, said flaps overlying said tapes and having opposed edges; substantially self-sustaining elements mounted in closely spaced relation along the opposed edges of said flaps and overlying said interlocking elements, said substantially self-sustaining elements forming wear resistant surfaces for the slider operating means, said tapes comprising means for retracting the edges thereof carrying the interlocking elements when said closure member is opened, said interlocking elements being concealed by said flaps and self-sustaining elements when said closure member is opened.

12. A closure member comprising a pair of tapes arranged in the same plane and in parallel abutting relation; interlocking elements mounted on abutting edges of said tapes; a slider having operating means for operating said interlocking elements, means longitudinally mounted on each of said tapes, said means overlying said tapes and having opposed edges; substantially rigid elements mounted in closely spaced relation along the opposed edges of said means and overlying said interlocking elements, said substantially rigid elements forming wear resistant surfaces for the slider operating means, said tapes comprising elastic means for retracting the edges thereof carrying the interlocking elements when said closure member is opened, said interlocking elements being concealed by said overlying means and rigid elements when said closure member is opened.

13. A closure member comprising a pair of tapes arranged in the same plane and in parallel abutting relation; interlocking elements mounted on abutting edges of said tapes; a slider having operating means for operating said interlocking elements, means longitudinally mounted on each of said tapes, said means overlying said tapes and having opposed edges; substantially self-sustaining ornamental material continuously mounted along the opposed edges of said means and overlying said interlocking elements, said substantially self-sustaining ornamental material forming wear resistant surfaces for the slider operating means.

14. A closure member comprising a pair of tapes arranged in the same plane and in parallel abutting relation; interlocking elements mounted on abutting edges of said tapes; a slider having operating means for operating said interlocking elements; means longitudinally mounted on each of said tapes, said means overlying said tapes and having opposed edges; substantially rigid elements mounted in closely spaced relation and clamped over the opposed edges of said means, said substantially rigid elements forming wear resistant surfaces for the slider operating means.

15. A closure member comprising a pair of tapes arranged in the same plane and in parallel abutting relation; interlocking elements mounted on abutting edges of said tapes; a slider having operating means for operating said interlocking elements; a flap longitudinally mounted on each of said tapes, said flaps overlying said tapes and having opposed edges; ornamental metallic elements mounted in closely spaced relation along the opposed edges of said flaps, said ornamental metallic elements being folded over and clamped about the opposed edges of said flaps and overlying said interlocking elements, said ornamental metallic elements forming wear resistant surfaces for the slider operating means.

16. A closure member comprising a pair of tapes arranged in the same plane and in parallel abutting relation; interlocking elements mounted on abutting edges of said tapes; a slider having operating means for operating said interlocking elements; means longitudinally mounted on each of said tapes, said means overlying said tapes and having opposed edges; substantially self-sustaining strips united with said means, the opposed edges of said substantially self-sustaining strips being substantially abutting and overlying said interlocking elements, said substantially self-sustaining strips forming wear resistant surfaces for the slider operating means.

RALPH KAY.